United States Patent Office 3,582,422
Patented June 1, 1971

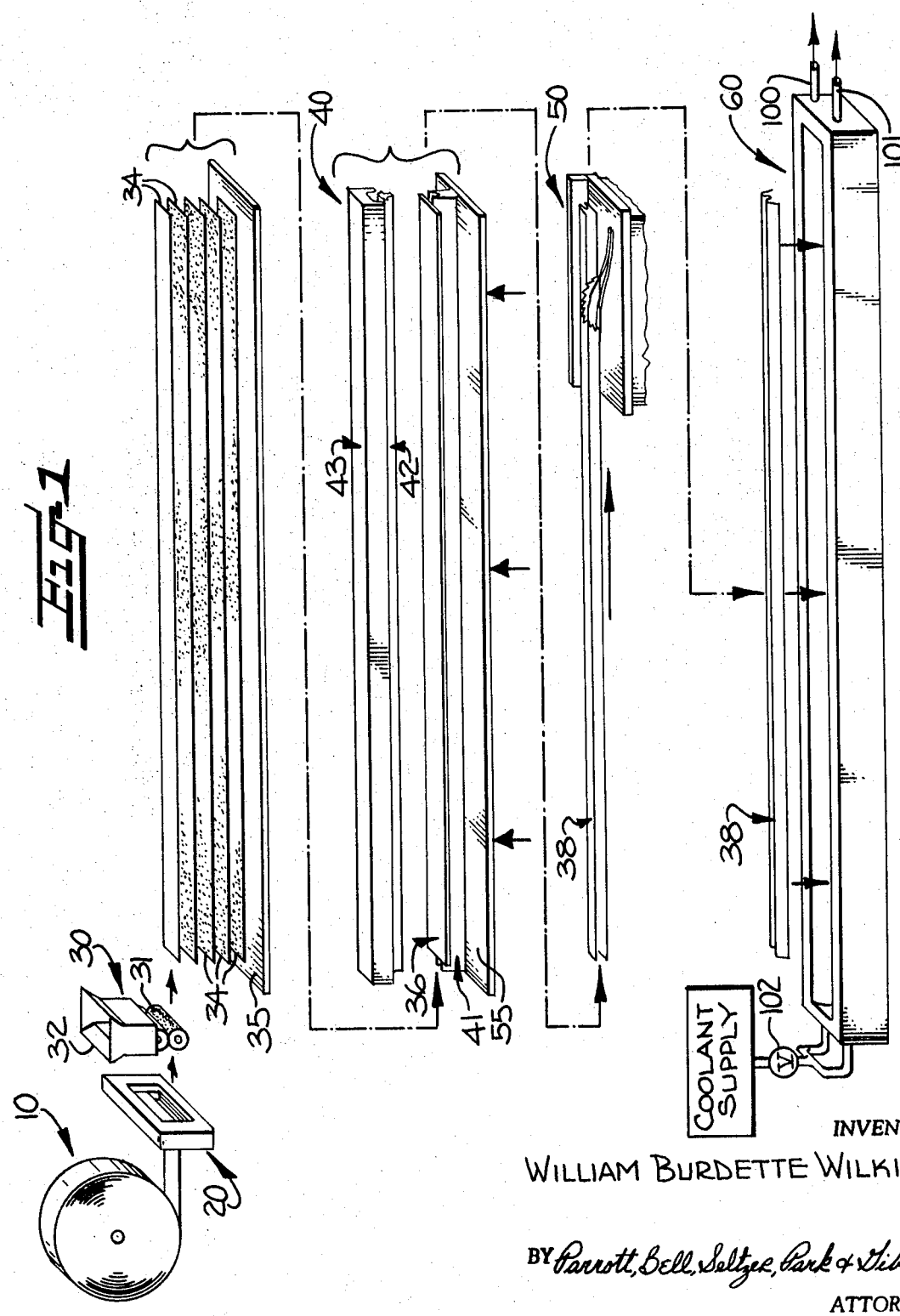

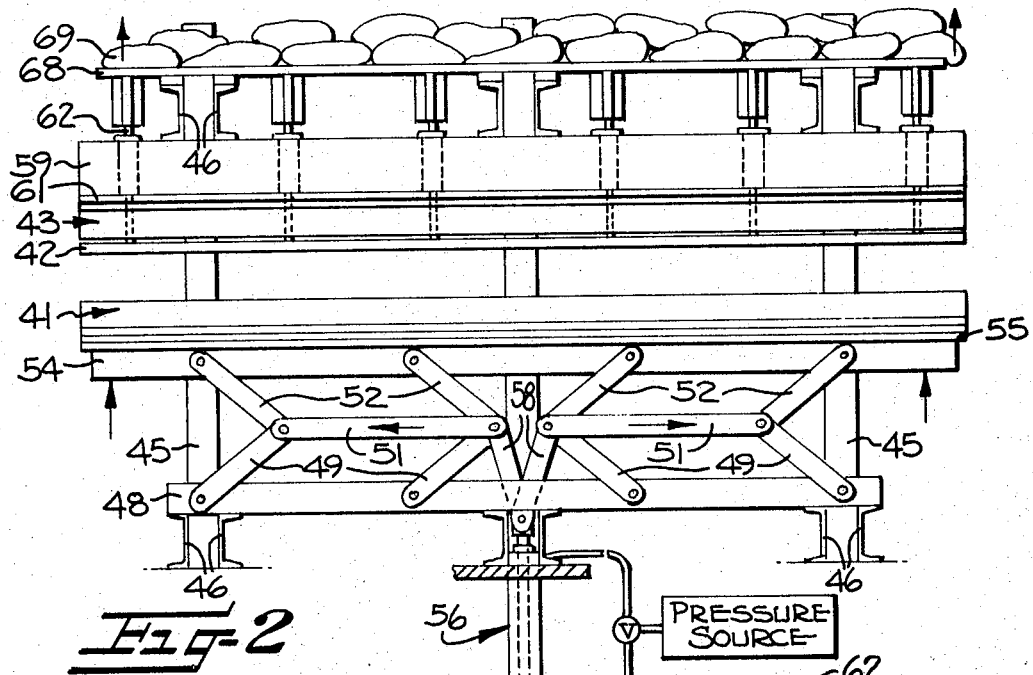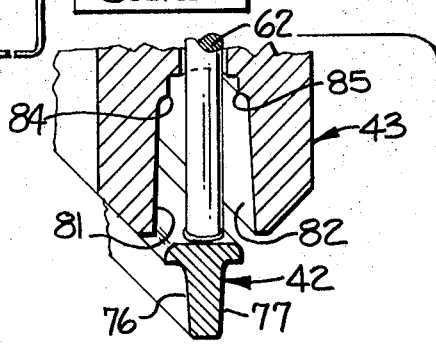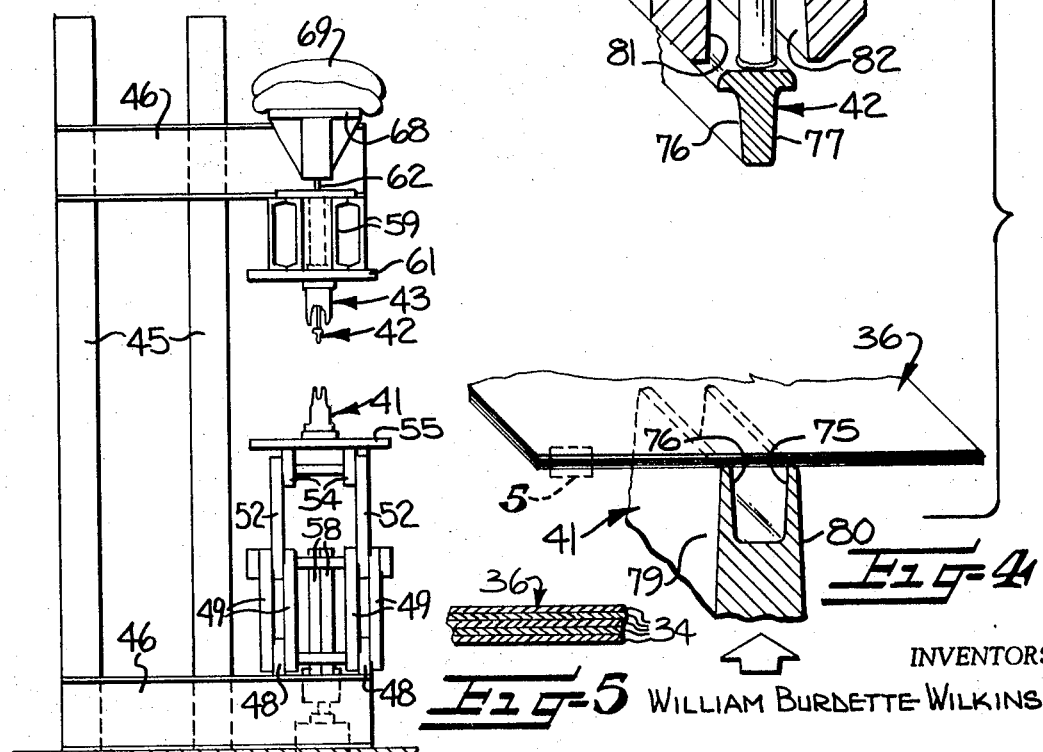

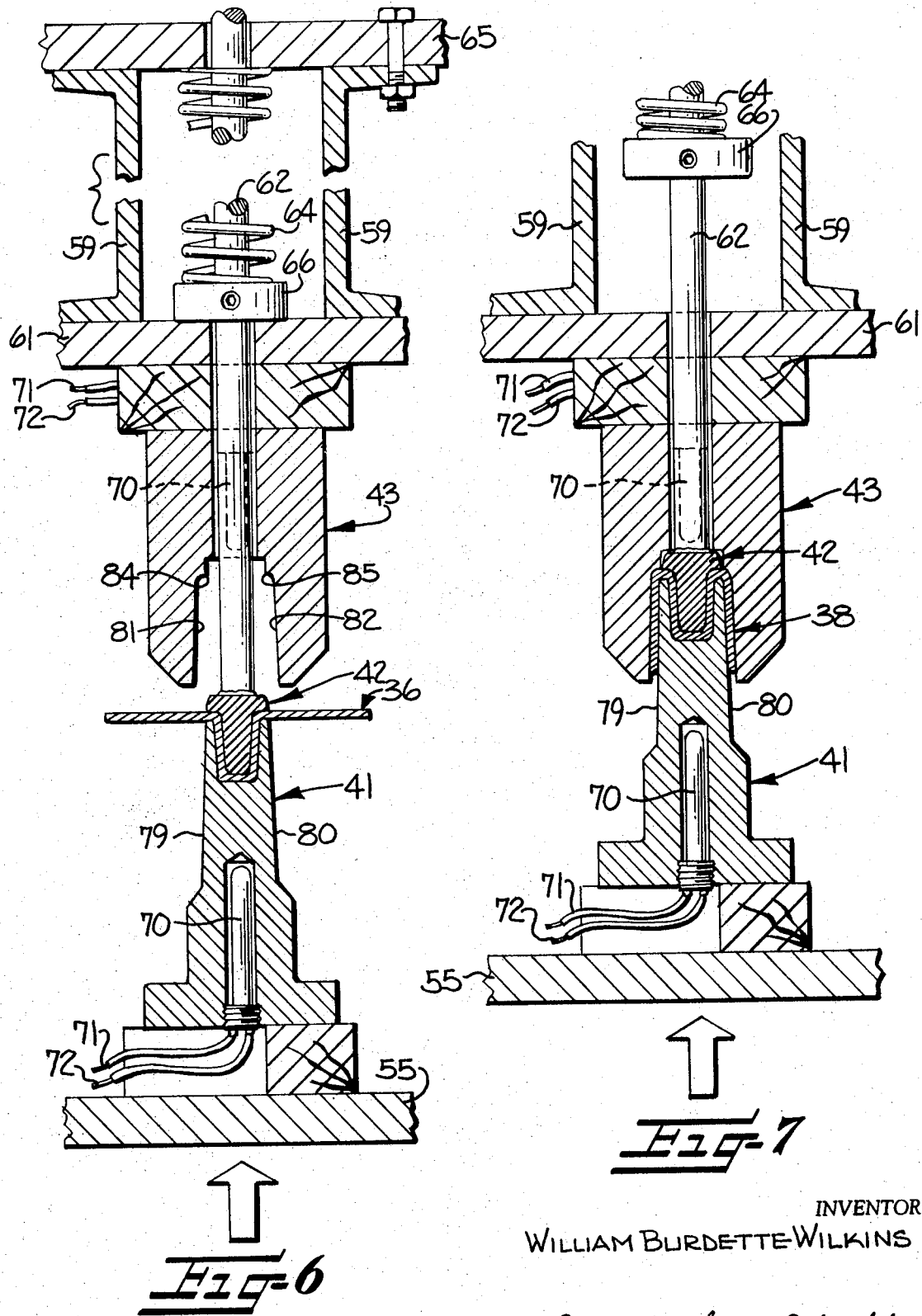

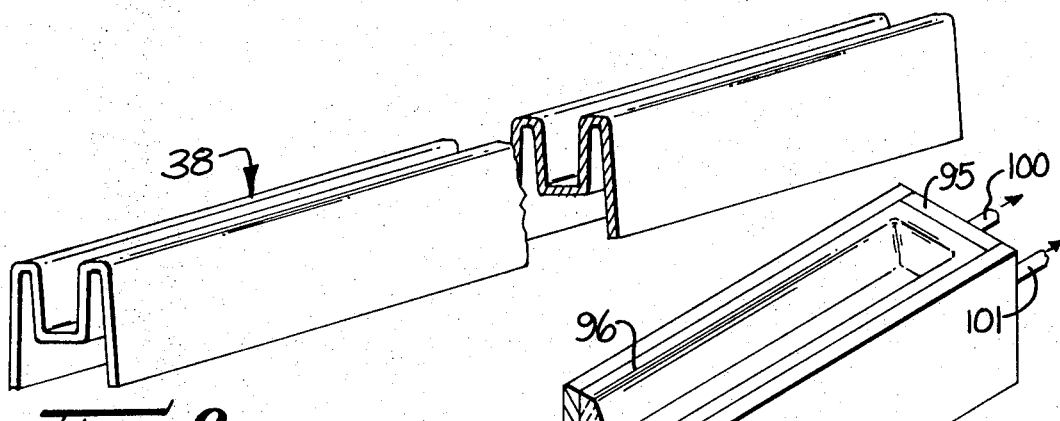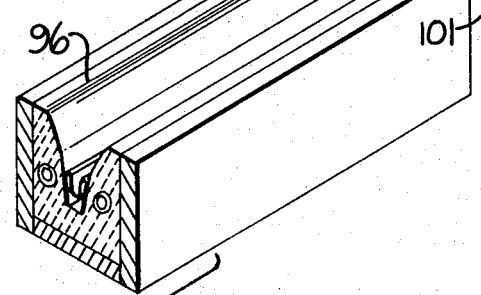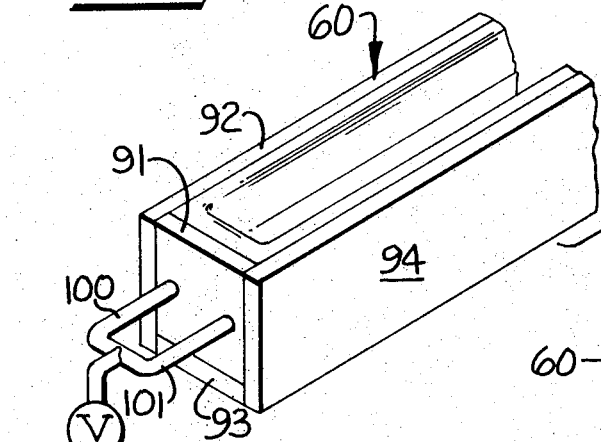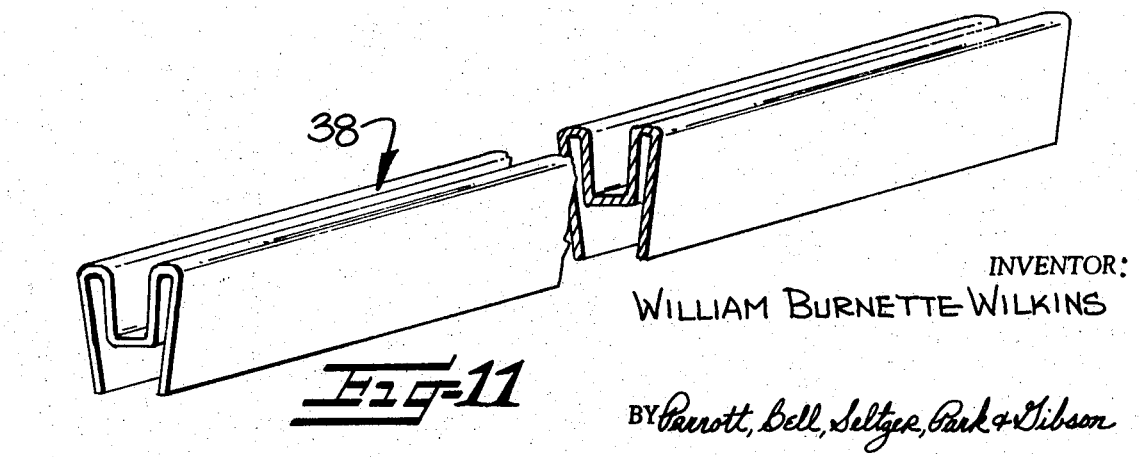

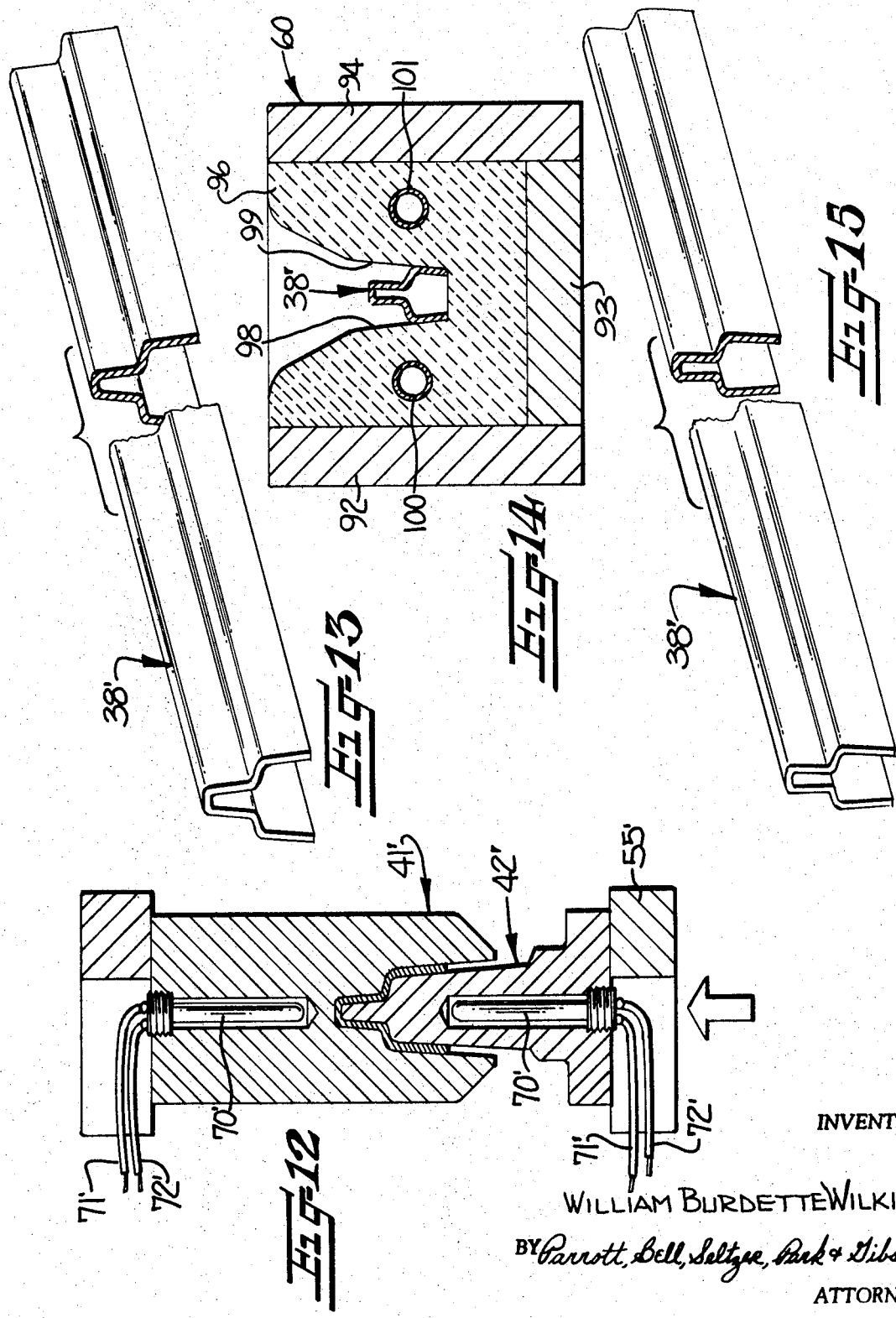

3,582,422
METHOD FOR FORMING BUILDING PANEL JOINTS
William Burdette Wilkins, Louisburg, N.C., assignor to Comstruct, Inc., Lincolnton, N.C.
Filed Sept. 30, 1968, Ser. No. 763,506
Int. Cl. B32b 31/20
U.S. Cl. 156—222
6 Claims

ABSTRACT OF THE DISCLOSURE

A method and apparatus for forming sheet material into a joint member particularly adapted for assembly with facing members and a core into a prefabricated building panel and wherein strip form sheet material is supplied to apparatus including adhesive spreading means for applying adhesive to at least one surface thereof and a plurality of elongate, substantially common length, narrow width sheets are stacked with adhesive therebetween to form a layered joint blank. The layered joint blank is interposed between at least two elongate mold members supported for relative movement for bonding and shaping the layered joint blank into an elongate joint member. Subsequent to molding and bonding of the layered joint blank, the molded joint member is shaped to position elongate leg portions thereof in an inwardly biased converging relationship by insertion of the molded joint member into a postforming device, so that the inwardly biased relationship of the legs permits gripping engagement of a peripheral portion of a panel core positioned between the legs.

Many of the various prefabricated building panel systems which have heretofore been proposed have in common certain problems regarding the members provided for joining one prefabricated panel to an adjacent panel in assembling a building structure. Though considering the various proposals which have been made for such structures and joint members, it may be determined that a joint member desirably is so constructed as to be relatively inexpensive to manufacture, have sufficient structural strength and integrity to serve as a structural member in the prefabricated panels, have sufficient resilience to accommodate misalignment in the assembly of the building structure and to provide tight sealing with a cooperating joint member, and be adapted for ready securement into the prefabricated building panel. Of all the joint constructions and members which have been publicized or disclosed in issued patents, none are known to fully meet all of these requirements and most are deficient in two or more of these areas. Specifically, those joint members which have resilience frequently have inadequate strength or cannot be readily assembled into a finished panel structure. Those joint members which have sufficient strength frequently are not sufficiently resilient, and may also present problems of assembly into a prefabricated building panel.

With the above discussion in mind, it is an object of the present invention to provide an apparatus and method for the production of joint members which are particularly well adapted for assembly into prefabricated building panels, in that the joint members more nearly attain the desirable characteristics for such a joint structure than has heretofore been possible. In realizing this object of the invention, a method is provided for the formation of joint members by the lamination of sheet material. Such laminated sheet material joint members, as hereinafter pointed out, may be produced economically while attaining the necessary strength and retaining sufficient resilience to serve the needed functions in a prefabricated building panel. Additionally, laminated sheet material joint members are particularly well adapted for bonding assembly into a prefabricated building panel.

It is a further object of the present invention to provide apparatus for producing an elongate joint member, which apparatus particularly facilitates the assembly of a stacked layered joint blank and the molding of the joint blank into an elongate joint member of bifurcated cross-sectional configuration by the provision of mold members of predetermined configuration and means cooperating with the mold members in the formation therebetween of joint members.

Yet a further object of this invention is to provide a method and apparatus for the production of joint members as described above wherein the joint members produced have a characteristic pinchiness which permits gripping engagement of a molded joint member with a portion of a panel core inserted into the joint member, thereby facilitating assembly of the joint member with other panel elements into a prefabricated building panel.

Some of the objects of the invention having been stated, other objects will appear as the description proceeds, when taken in connection with the accompanying drawings, in which—

FIG. 1 is a schematic diagram of the flow of material through the apparatus of the present invention, illustrating certain features of the method of the present invention;

FIG. 2 is a side elevation view of a forming apparatus in accordance with the present invention;

FIG. 3 is an end elevation view of the apparatus of FIG. 2;

FIG. 4 is an enlarged perspective view, in partial section, through certain portions of the apparatus of FIG. 2;

FIG. 5 is an enlarged cross-sectional view through a portion of a layered joint blank in accordance with the present invention, interposed between mold members of the apparatus of FIGS. 2 through 4, taken generally from the area indicated in FIG. 4;

FIG. 6 is an enlarged section view through a portion of the apparatus of FIG. 2, showing one step in the molding of a joint member of a first type in accordance with the present invention;

FIG. 7 is a view similar to FIG. 6, showing the finishing of the molding of a joint member;

FIG. 8 is a perspective view of the first type of joint member as produced in accordance with the present invention at an intermediate point in its production;

FIG. 9 is a perspective view of a postforming device included in the apparatus of FIG. 1;

FIG. 10 is a sectional view through the device of FIG. 9, illustrating the insertion of a joint member into the device of FIG. 10;

FIG. 11 is a view similar to FIG. 8, showing the first type of joint member in its finished state;

FIG. 12 is a view similar to FIG. 7, showing the finishing of the molding of a joint member of a second type;

FIG. 13 is a view similar to FIG. 8 of the second type of joint member at an intermediate point in its production;

FIG. 14 is a view similar to FIG. 10, illustrating the insertion of the second type of joint member into the postforming device of FIG. 9; and FIG. 15 is a view similar to FIG. 11, showing the second type of joint member in its finished state.

Referring now more particularly to the drawings, the sequence of operations involved in the production of an elongate joint member in accordance with the present invention may be best generally described with reference to the schematic flow diagram of FIG. 1. Sheet material is supplied in the form of a roll 10, of predetermined width and any appropriate length. The sheet material of the roll 10 is a paperboard stock such as kraft paperboard having a thickness of 20 to 24 points (thousandths of an inch) and a weight of approximately 90 to 100 pounds by board measure. The sheet material is drawn from the roll 10 through an appropriate cutting means 20 and an adjacent adhesive spreader 30, so that a plurality of strips 34 of sheet material, having adhesive interposed therebetween, are laid up on an appropriate table surface 35, to form a layered joint blank 36. In spreading adhesive on to the strips 34 by passing the same beneath a spreading roller 31 of the adhesive spreader 30, to which an appropriate adhesive such as a urea formaldehyde resin of special formulation is supplied from a hopper 32, it is preferred to spread adhesive only on one side of the strips 34 and to pass one strip with no adhesive being spread thereon. This is done to insure that the layered joint blank formed by stacking the strips 34 does not have an adhesive-coated face exposed.

A layered joint blank 36 is then advanced to a forming apparatus for molding the same into an elongate joint member, which apparatus is generally indicated at 40 and includes cooperating mold members and means for pressing a layered joint blank 36 between the cooperating mold members to mold the same into an elongate joint member 38 of bifurcated cross-sectional configuration and having spaced apart legs interconnected by a web portion. The particular construction and arrangement of the forming apparatus 40 will be discussed more fully hereinafter with reference to FIGS. 2–7 and 12.

The molded joint member 38, on removal from the apparatus 40 which forms the same, is passed through an edge trimming saw generally indicated at 50, for trimming of the legs of the molded joint member to a common length, and the legs of the joint member 38 are shaped by insertion of the joint member 38 into a postforming device, generally indicated at 60 and described more fully hereinafter with reference to FIGS. 9 and 10. On insertion of the molded joint member 38 into the postforming device 60, the molded joint member is shaped to position at least the outer extremities of the legs thereof closer together in an inwardly converging relationship, so that the conveying relationship of the legs permits outward deflection thereof for gripping engagement of a portion of the panel core positioned between the legs. On removal of the shaped molded joint member from the postforming device 60, the production of the joint member has been completed.

Turning now to the apparatus 40 for forming stacked layers of adhesive-coated sheets of material into a joint member, attention is drawn to FIGS. 2–7 and 12 of the drawings, wherein the apparatus 40 is shown in full detail and as arranged for producing elongate joint members of bifurcated cross-sectional configuration having a pair of elongate, substantially parallel, legs. Specifically, an elongate member of a first cross-sectional configuration is formed by a sequence shown in FIGS. 4, 6 and 7 of a joint member of a second type is shaped as shown by FIG. 12. The first and second types of joint members are particularly adapted for use, respectively, as the female or groove and the male or tongue joint members extending along the edges of a prefabricated building panel. The particular adaptation of the joint members flows in substantial part from the characteristics imparted thereto by the apparatus and method of the present invention.

More particularly, the bifurcated cross-sectional configuration of the joint members includes a pair of elongate legs which, in a completed panel structure, function to provide large areas of bonding between the joint members and the other elements of the prefabricated panel. Further, the elongate legs of the joint members, which together define an open sided channel, are positioned in a converging relation toward the free edges of the legs or toward the open side of channel defined therebetween. Thus, the legs may be spread apart for the insertion of a peripheral edge portion of a panel core therebetween. By the imparting to the joint members of a set whereby the legs are resiliently maintained in converging relationship, the spreading apart of the legs result in the legs being biased one toward the other for gripping engagement with the panel core inserted therebetween. Thus, the joint members are particularly adapted for temporary securement in place during the process of assembling the building panel by the gripping engagement with the edges of the panel core.

The apparatus 40 for forming stacked layers of adhesive-coated sheet material includes at least two elongate mold members such as a first elongate mold member 41 having an elongate recess therein and a second elongate mold member 42 generally equal in length to the length of the first mold member 41 and having a rib throughout its extent with a cross-sectional configuration dimensioned to be received within the first mold member (as shown for example in FIG. 6). As will be discussed further hereinafter, the second type of joint member contemplated by this invention is shaped between such a pair of mold members. The apparatus may include a third mold member 43 for forming a first type of joint member, having length similar to that of the first and second mold members 41 and 42 and an elongate recess therein arranged in opposing relation to that of the first mold member 41. The third mold member 43 is dimensioned relative to the first and second mold members 41 and 42 for receiving the same therewithin (as in FIG. 7), as described more fully hereinafter.

The apparatus 40 further includes means mounting the mold members in parallel relation and for relative movement between a spaced apart position (as shown in FIGS. 3 and 4) for insertion and removal of stacked layers therebetween and a forming position (as in FIGS. 6, 7 and 12) wherein the rib of one mold member is received in the elongate recess of the other mold member for forming the stacked layers into an elongate joint member. The means mounting the mold members preferably includes a stationary frame, suitably provided by a plurality of vertical standards 45 and a number of horizontally extending beam members 46. Supported on the lowermost horizontal beam 46 is a stationary base link 48 of a linkage arrangement which functions to move one of the first and second mold members 41 and 42 relative to the other mold member. Pivotally mounted on the base link 48 for movement relative thereto are a plurality of first moving link members 49, each of which is pivotally connected to a horizontally moving connecting link member 51 and to a second moving link member 52. The second moving link members 52 are pivotally connected, adjacent the upper extremities thereof, to an elongate third moving link member 54 which supports a moving table 55 on which the moving one of the elongate mold members is mounted. Movement of the moving link members connected between the stationary base link 48 and the third moving link 54 proceeds under the influence of a pressure fluid jack device or cylinder 56, preferably mounted beneath the lower beams 46 and operatively connected with the suitable pressure source (as schematically illustrated in FIG. 2). By suitable connecting links 58, the extensible piston rod of the cylinder device 56 is operatively connected to the various moving links of the link arrangement of the apparatus 40, to control movement of the table 55 having a mold member mounted thereon vertically relative to the stationary members of the apparatus 40.

In order to support at least one mold member in opposition to the mold member mounted upon the moving table 55, the stationary structure of the apparatus 40 further includes a plurality of elongate horizontally extending supporting beams 59 secured beneath the upper horizontal beams 46 and having a plate member 61 secured to the lower surface thereof. A stationary upper mold member, such as the third mold member 43 of FIGS. 4, 6 and 7, is supported relative to the moving mold member by being secured directly to the plate 61, and such an arrangement is employed for a pair of cooperating mold members under certain operating conditions as discussed hereinafter. In the instance where three mold members are employed in forming stack layers of adhesive-coated sheet material, the second elongate mold member 42 is mounted by the apparatus 40 for movement relative to the plate member 61 and the other stationary frame members of the apparatus 40. Such a mounting arrangement is accomplished by providing a plurality of rod members 62 secured to the second mold member 42 and extending upwardly therefrom at spaced apart locations (as shown in phantom lines in FIG. 2) to penetrate the plate member 61 and extend upwardly between the horizontal channel members 59.

In order to bias the second mold member 42 downwardly, toward the elongate recess formed in the first mold member 41, biasing means are provided for acting on the rod members 62. The biasing means, in the illustrated embodiment, operates under two physical principles to apply a predetermined load force to the second mold member 42. First, a plurality of compression springs 64 are mounted between the channel members 59 and encircling each of the rods 62 (FIGS. 6 and 7). With the second mold member 42 in the extreme downward position (as in FIGS. 4 and 6), the compression springs 64 extend between the plate member 61 and an upper stop member 65. Upward movement of the rod member 62 results in compression of the spring 64 between a stop collar 66 and the upper stop plate 65, thus causing a biasing force to operate against the second mold member 42. Additionally, the upper extremity of each of the rods 62 is operatively connected to a weight platform 68 extending above the upper horizontal beam members 46. The weight platform 68 has suitable weighting means disposed thereon, such as a plurality of sand bags 69, which provide a weight bias acting on second mold member 42 to urge the same downward. In an operating apparatus corresponding to that shown in the drawings, the total biasing force acting downwardly on the second mold member 42, as a result of the combined actions of the compression springs 64 and the sand bags 69, is in excess of 2,000 pounds.

In order to heat at least one of the mold members mounted in the apparatus 40, those mold members which are supported directly upon the moving table 55 and the stationary plate member 61 are formed with internal cavities therewithin, for receiving encapsulated cartridge electrical heaters 70 (FIGS. 6 and 7). Preferably, blind holes are drilled into the mold members, such as the first mold member 41 and the third mold member 43, at predetermined spaced intervals therealong and the cartridge heaters 70 are inserted into the blind holes and sealed in heat transfer relationship with the mold member. Suitable conductors 71 and 72 are provided for operatively connecting the cartridge heaters 70 with a source of electrical current, such as line voltage.

In employing the apparatus 40 in the production of elongate joint members, a layered joint blank 36 is disposed between the first mold member 41 and the second and third mold members 42 and 43 while the same are in their spaced apart positions (FIG. 4). The joint blank 36, shown in enlarged cross-section in FIG. 5, is composed of a plurality of stacked layers 34, having adhesive extending therebetween. Preferably, the sheet material from which the layers 34 are formed is kraft paperboard of 90 to 100 pound weight, by paperboard measure, having a thickness of 20 to 26 points (thousandths of an inch). In a process currently in operation, the adhesive interposed between adjacent layers of the sheet material is a specially formulated urea formaldehyde resin, including a slipping agent such as glycol. The need for a slipping agent will become more clear hereinafter, as the discussion of the formation of the joint blank 36 into a joint member proceeds. Each of the sheets 34 extends from side to side of the joint blank 36, and will extend from one free edge of the final product joint member through to the other free edge thereof.

In order to form the joint blank 36 into an elongate joint member, the same is molded between the opposed, parallel-mounted, elongate mold members 41, 42 and 43, by supplying pressure fluid to the cylinder device 56 and raising the moving table 55 on which the first mold member 41 is mounted. Upon raising the table 55 to a first forming position (FIG. 6), the rib of the second mold member 42 enters into the elongate recess of the first mold member 41, with the material of the joint blank 36 being interposed therebetween. In connection with this forming step, it is to be noted that the elongate recess of the first mold member 41 is defined by a pair of spaced apart sidewalls 74 and 75 and that the sidewalls diverge one from the other toward the open side of the recess. The second mold member 42 includes a nose portion at the exposed edge of the rib thereof and a shoulder portion adjacent the point of connection between the mold member 42 and the supporting rod member 62. Between the nose and shoulder portions extend rib sidewalls 76 and 77, which diverge from the nose portion toward the shoulder portion. The dimensions of the first and second mold members 41 and 42 and the angles of divergence of the sidewalls thereof are such that sufficient space is provided therebetween for accommodating a predetermined number of the layers 34 of the joint blank 36, such as five or six layers, provided that the layers 34 are of predetermined thickness as mentioned above. However, in molding the joint blank 36 about the rib of the second mold member 42 and into the elongate recess of the first mold member 41, it is necessary that the layer 34 most closely adjacent the recess sidewalls 74 and 75 have a greater length thereof within the mold members than is true for the layer 34 which is in contact with the rib sidewalls 76 and 77 of the second mold member 42. Thus, the sheet material of these layers must slip in accommodating the molding process. The inclusion of the slipping agent such as glycol in the specially formulated urea formaldehyde resin is made for this specific purpose.

It will be further noted that the first mold member 41 includes exterior sidewalls 79 and 80, spaced apart a predetermined distance and diverging away from the recessed edge of the mold member 41. In order to provide for cooperation between the first and second mold members 41 and 42 and the third mold member 43, as pointed out more fully hereinafter, it is preferred that the shoulder portion of the second mold member 42 have a predetermined width corresponding generally to the spacing between the exterior sidewalls 79 and 80 of the first mold member 41, at a point adjacent the recessed edge thereof. This relationship is brought out in FIG. 6. Further, the third mold member 43 has the elongate recess therein defined by internal recess sidewalls 81 and 82, converging from the recessed edge and terminating adjacent the inward edge of a recess in inwardly curved shoulder portions 84 and 85. The inwardly curved shoulder portions 84 and 85 are dimensioned to cooperate with the shoulder portion of the second mold member 42, in shaping a reversed curve for the first type of joint member. The angle of convergence and the spacing between the recess sidewalls 81 and 82 of the third mold member 43 are such as to receive the first mold member 41 therewithin with the material of the joint blank 36 and the second mold member 42 interposed between the first mold member 41 and the third mold member 43 (as shown in FIG. 7). Thus, floating mounting of the second mold member 42 relative to the stationary members of the apparatus of 40 permits entrance of the first and second mold members 41 and 42 into the elongate recess of the third mold member 43 upon continued movement of the moving table 55 of the apparatus 40 from the first forming position of FIG. 6 to the second forming position of FIG. 7.

As such movement proceeds, the wing portions of the joint blank which extend outwardly from the mated first and second mold members 41 and 42 (FIG. 6) are bent in the reverse direction to complete the forming of the joint blank 36 into a finished joint member 38 (FIGS. 1 and 8). As may be seen, the finished joint member 38 is of the first type, and is a shell-like member of bifurcated cross-sectional configuration. Viewing the cross-sectional configuration of the joint member 38, it may be noted that the cross-sectional configuration includes a pair of generally parallel legs and a web portion extending between and joining together two of the elongate side edges of the legs. Between the free edges of the legs of the joint member 38 is defined an elongate channel, into which a panel core is placed in assembling the joint member into a finished prefabricated building panel (not shown in these drawings). The assembly of the joint member with other elements into a prefabricated building panel and the prefabricated building panel so constructed are the subject matter of another patent application, copending with this application.

As the molding of the joint blank 36 into the joint member 38 proceeds, the joint blank 36 is heated by the heated mold members 41 and 43. Preferably, the operating temperature of the heated mold members 41 and 43 is approximately 250° F. and the molds are maintained in the closed position of FIG. 7 at completion of formation of the molded joint member 38 for a time period of approximately 25 seconds. During the imposition of heat and pressure on the joint blank 36 in this manner, the layers 34 of the joint blank are bonded together by means of the adhesive therebetween, to form the molded joint member 38. It is to be understood that the temperature used and time of molding may be varied depending upon the choice made of adhesives and of sheet material.

Thereafter, in order to set the legs of the joint member 38 in an inwardly converging relationship, the molded joint member is shaped to position at least the outer extremities of the legs closer together. Preferably, the molded joint member 38 is shaped by insertion into a postforming device 60, as illustrated in FIGS. 1, 9 and 10. The postforming device 60 includes appropriate trough members 91, 92, 93, 94 and 95 enclosing a body 96 of suitable material such as plaster. The body 96 of plaster is shaped to define an elongate upwardly opening channel or recess, including a pair of spaced apart channel sidewalls 98, 99 which diverge upwardly toward the open side of the channel. Embedded into the body 96, so as to be in heat exchange relationship with the channel sidewalls 98 and 99, are a pair of coolant fluid conduits 100, 101. During use of the device 60, suitable coolant fluid is provided from an appropriate supply source and directed to flow through the conduits 100 and 101, such as by connecting those conduits through a flow control valve 102 to a water chiller for the circulation of cold water to and through the postforming device 60. Upon insertion of a molded joint member 38 into the postforming device 60, while the molded joint member 38 is still in a heated condition, the legs of the joint member are positioned in a converging relation by the sidewalls 98 and 99 of the channel and the joint member is subjected to a coolant treatment which causes the joint member to set or become rigid with the leg portions in the converging relationship. Upon removal of the joint member 38 from the postforming device 60, production of the joint member is completed and the final product (as shown in FIG. 11) may then be stored until an appropriate time for assembling into a building panel.

While the discussion to this point has proceeded with reference to a bifurcated joint member 38 which has a generally M or W shaped cross-sectional configuration, in that the web portion thereof which joins the spaced apart leg portions is located largely between the leg portions, it is contemplated that the apparatus and method of the present invention may be applied to the production of a joint member designed to mate with the joint member 38. This second type of joint member, identified in FIGS. 12–15 as joint member 38', is formed by a process identical to that described hereinabove with reference to the first type, M configuration, joint member 38. With reference to the portions of apparatus illustrated in FIGS. 12 and 14 as being used in the production of joint members 38' of the second type, prime notation has been applied to portions of the apparatus corresponding to those described hereinabove. The principal distinction between the two types of joint members 38 and 38' lies in the formation of the second type of joint member 38' with the web portion thereof extending outwardly from the leg portions to define, in effect, an extension of the leg portions which forms a tongue mating with the elongate groove of joint member 38. In both instances, the assembly of the joint members 38 and 38' into a panel structure proceeds by spreading apart the legs of the bifurcated joint members for the insertion of a building panel core therebetween, and thereafter bonding to the leg portions of the joint members facing members which, together with the core, complete the assembly.

In the drawings and specification there have been set forth preferred embodiments of the invention and, although specific terms are employed, they are used in a generic and descriptive sense only and not for purposes of limitation, the scope of the invention being defined in the claims.

I claim:

1. A method of forming sheet material into a joint member particularly adapted for assembly with facing members and a core into a prefabricated building panel and comprising the steps of
    stacking a plurality of elongate, substantially common length, narrow width sheets with adhesive therebetween to form a layered joint blank therefrom,
    pressing the joint blank between an elongate, heated recessed mold member and an elongate, heated ribbed mold member and thereby bonding adjacent layers of the joint blank to each other, applying heat to the joint blank and bending the joint blank into an elongate joint member of bifurcated cross-sectional configuration having a pair of elongate legs arranged in diverging relationship, and
    shaping the molded joint member to position at least the outer extremities of the legs closer together in an inwardly converging relationship by bending the legs while still in heated condition into a converging relationship and thereafter cooling the same to facilitate setting the same in the converging relationship whereby the converging relationship of the legs permits outward deflection thereof for gripping engagement of a portion of a panel core positioned between the legs.

2. A method according to claim 1 including trimming the legs of the molded joint member to a common length.

3. A method of forming sheet material into a joint member particularly adapted for assembly with facing members and a core into a prefabricated building panel and comprising the steps of
    stacking a plurality of elongate, substantially common length, narrow width sheets with adhesive therebetween to form a layered joint blank therefrom,
    pressing the joint blank between an elongate recessed mold member and an elongate ribbed mold member and thereby bonding adjacent layers of the joint blank to each other and bending the layered joint blank into an elongate joint member of bifurcated cross-sectional configuration having a pair of elongate legs arranged in diverging relationship, and
    bending the molded joint member to position at least the outer extremities of the legs closer together in an inwardly converging relationship whereby the converging relationship of the legs permits outward deflection thereof for gripping engagement of a portion of a panel core positioned between the legs.

4. The method according to claim 3 including successively removing predetermined cut lengths of sheet material from a roll thereof while applying adhesive thereto to form the stacked layered joint blank.

5. A method according to claim 3 including applying heat to the joint blank during the bonding of the layers thereof and the formation therefrom of the molded joint member.

6. A method according to claim 3 wherein the step of shaping the molded joint member for imparting an inward converging relation to the legs thereof includes positioning the legs while in heated condition in a converging relation and thereafter subjecting the same to a cooling treatment to facilitate setting the same in the converging relationship.

References Cited

UNITED STATES PATENTS

| | | | |
|---|---|---|---|
| 2,084,107 | 6/1937 | Parkinson | 52—401 |
| 2,429,192 | 10/1947 | Piper | 156—222 |
| 2,561,449 | 7/1951 | Ruderman | 156—222X |
| 3,038,830 | 6/1962 | Groves | 156—222X |

SAMUEL W. ENGLE, Primary Examiner

U.S. Cl. X.R.

156—245, 583